United States Patent
Nishimaki et al.

(10) Patent No.: US 10,532,278 B2
(45) Date of Patent: Jan. 14, 2020

(54) INFORMATION PROCESSING DEVICE AND METHOD FOR PRESENTING ODORS TO A USER

(71) Applicant: SONY INTERACTIVE ENTERTAINMENT INC., Tokyo (JP)

(72) Inventors: Yoichi Nishimaki, Kanagawa (JP); Shinichi Hirata, Kanagawa (JP); Yuichi Machida, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/773,706

(22) PCT Filed: Jul. 15, 2016

(86) PCT No.: PCT/JP2016/070984
§ 371 (c)(1),
(2) Date: May 4, 2018

(87) PCT Pub. No.: WO2017/094284
PCT Pub. Date: Jun. 8, 2017

(65) Prior Publication Data
US 2018/0318706 A1    Nov. 8, 2018

(30) Foreign Application Priority Data
Nov. 30, 2015    (JP) ................ 2015-233566

(51) Int. Cl.
*A63F 13/28*    (2014.01)
*G06T 7/70*    (2017.01)
*G06F 3/00*    (2006.01)

(52) U.S. Cl.
CPC .............. *A63F 13/28* (2014.09); *G06F 3/002* (2013.01); *G06T 7/70* (2017.01); *A63F 2300/8082* (2013.01)

(58) Field of Classification Search
CPC .... A63F 13/28; A63F 2300/8082; G06T 7/70; G06F 3/002; G06F 3/01; G09F 19/00
See application file for complete search history.

(56) References Cited

U.S. PATENT DOCUMENTS

| | | | |
|---|---|---|---|
| 2005/0130747 A1* | 6/2005 | Kubby | A01M 1/2077 463/48 |
| 2007/0210183 A1* | 9/2007 | Kubby | A01M 1/2044 239/102.1 |

(Continued)

FOREIGN PATENT DOCUMENTS

| | | |
|---|---|---|
| JP | 10-066058 A | 3/1998 |
| JP | 2013-074476 A | 4/2013 |

OTHER PUBLICATIONS

International Search Report and Written Opinion dated Aug. 30, 2016, from the corresponding International Application No. PCT/JP2016/070984, 6 sheets.

(Continued)

*Primary Examiner* — Corbett B Coburn
(74) *Attorney, Agent, or Firm* — Katten Muchin Rosenman LLP (57) ABSTRACT

Provided is an information processing device to be connected to an odor presentation device that presents an odor to a user. The information processing device acquires spatial odor information indicative of an odor in a reproduction target space, and instructs, by using the acquired spatial odor information, the odor presentation device to present to the user an odor assumably perceivable in the reproduction target space.

5 Claims, 4 Drawing Sheets

(56) References Cited

U.S. PATENT DOCUMENTS

| | | | |
|---|---|---|---|
| 2010/0114819 A1 | 5/2010 | Kim et al. | |
| 2011/0172931 A1 | 7/2011 | Murthy | |
| 2013/0154797 A1* | 6/2013 | Lee | G06F 3/002 |
| | | | 340/5.74 |
| 2014/0113715 A1* | 4/2014 | Joo | A63F 13/02 |
| | | | 463/30 |
| 2014/0115649 A1* | 4/2014 | Kim | H04N 21/234 |
| | | | 725/116 |
| 2014/0324932 A1 | 10/2014 | Chee et al. | |
| 2015/0241708 A1 | 8/2015 | Watanabe et al. | |
| 2016/0349216 A1* | 12/2016 | Ichimura | G01N 29/022 |
| 2017/0124797 A1* | 5/2017 | Chan | G07F 17/0014 |
| 2019/0011700 A1* | 1/2019 | Reiner | G02B 27/0103 |

OTHER PUBLICATIONS

International Preliminary Report on Patentability dated Jun. 5, 2018, from the corresponding International Application No. PCT/JP2016/070984, 11 sheets.

European Search Report dated Jul. 2, 2019, from European Patent Application No. 16 870 225.6, 12 sheets.

Keller PE E et al: "Transmission of Olfactory Information for Telemedicine", Interactive Technology and the New Paradigm for Healthcare, XX, XX, Jan. 19, 1995 (Jan. 19, 1995), pp. 168-172, XP000672044, * 3. Tele-Smell Demonstration; p. 170*.

* cited by examiner

| | θ=0° | θ=45° | θ=90° | θ=135° | θ=180° | θ=225° | θ=270° | θ=315° |
|---|---|---|---|---|---|---|---|---|
| REFERENCE ODOR F1 | 11 | 8 | 7 | 9 | 8 | 8 | 12 | 13 |
| REFERENCE ODOR F2 | 0 | 0 | 0 | 0 | 0 | 0 | 0 | 0 |
| REFERENCE ODOR F3 | 10 | 7 | 10 | 8 | 9 | 4 | 9 | 7 |
| REFERENCE ODOR F4 | 92 | 80 | 30 | 24 | 20 | 17 | 30 | 45 |
| REFERENCE ODOR F5 | 3 | 5 | 4 | 5 | 4 | 3 | 4 | 3 |
| REFERENCE ODOR F6 | 52 | 58 | 67 | 80 | 72 | 51 | 40 | 37 |
| REFERENCE ODOR F7 | 21 | 33 | 42 | 45 | 34 | 37 | 25 | 22 |
| REFERENCE ODOR F8 | 0 | 0 | 0 | 0 | 0 | 0 | 0 | 0 |

FIG. 5

INFORMATION PROCESSING DEVICE AND METHOD FOR PRESENTING ODORS TO A USER

TECHNICAL FIELD

The present invention relates to an information processing device for controlling an odor presentation device that presents an odor to a user. The present invention also relates to an odor presentation device control method and to a program.

BACKGROUND ART

Studies are being conducted on the use of an odor presentation device to present a specific odor to a user for the purpose of allowing the user to experience a realistic sensation, for example, in a video game. The odor presentation device presents an odor to the user by releasing an odorous substance (odorant) into the air.

SUMMARY

Technical Problem

It is demanded in the field, for example, of virtual reality that an odor be presented in such a manner as to enhance the realistic sensation.

The present invention has been made in view of the above circumstances. An object of the present invention is to provide an information processing device, an odor presentation device control method, and a control program that are capable of presenting an odor in such a manner as to enhance the realistic sensation by using an odor presentation device.

Solution to Problem

An information processing device according to the present invention is to be connected to an odor presentation device that presents an odor to a user. The information processing device includes a spatial odor information acquisition section and an odor control section. The spatial odor information acquisition section acquires spatial odor information indicative of an odor in a reproduction target space. The odor control section uses the spatial odor information in order to instruct the odor presentation device to present to the user an odor that is assumably perceivable in the reproduction target space.

An odor presentation device control method according to the present invention controls an odor presentation device that presents an odor to the user. The odor presentation device control method includes the steps of: acquiring spatial odor information indicative of an odor in a reproduction target space; and instructing, by using the spatial odor information, the odor presentation device to present to the user an odor that is assumably perceivable in the reproduction target space.

A program according to the present invention controls an odor presentation device that presents an odor to a user. The program causes a computer to function as an acquisition section and an odor control section. The acquisition section acquires spatial odor information indicative of an odor in a reproduction target space. The odor control section uses the spatial odor information in order to instruct the odor presentation device to present to the user an odor that is assumably perceivable in the reproduction target space. The program may be supplied on a non-transitory, computer-readable information storage medium.

DESCRIPTION OF EMBODIMENT

An embodiment of the present invention will now be described in detail with reference to the accompanying drawings.

Figure 1:
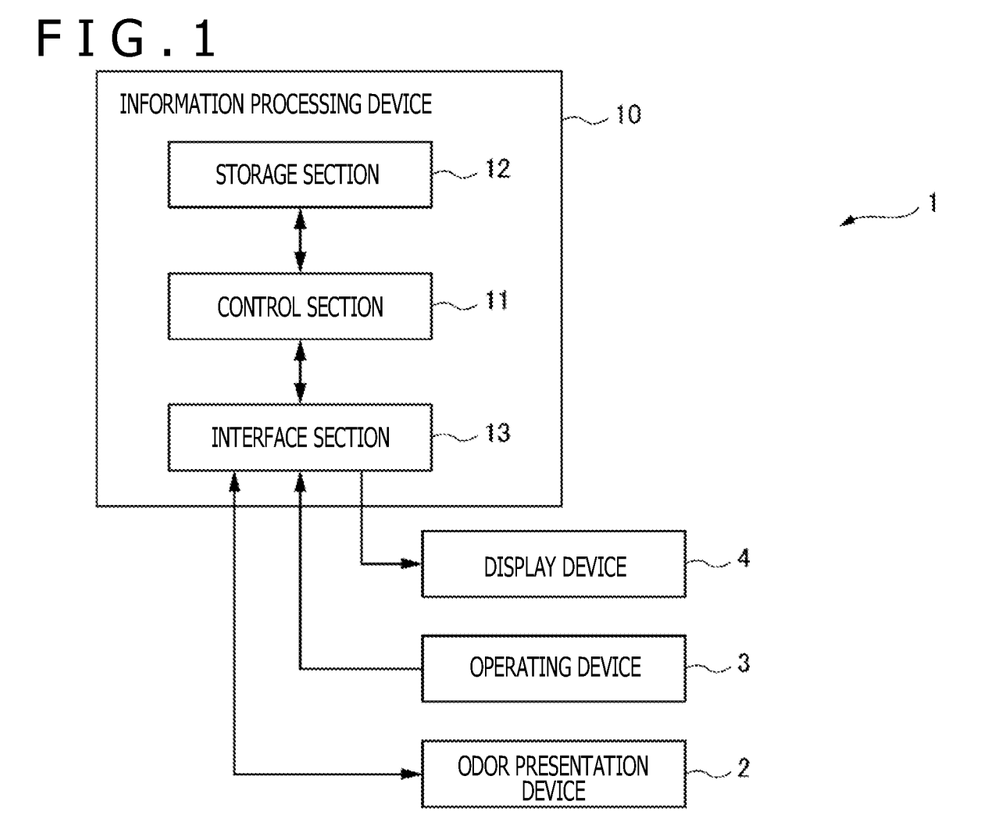
FIG. 1 is a block diagram illustrating a configuration of an odor presentation system that includes an information processing device according to an embodiment of the present invention.

FIG. 1 is a block diagram illustrating a configuration of an odor presentation system 1 that includes an information processing device 10 according to the embodiment of the present invention. As illustrated in FIG. 1, the odor presentation system 1 includes the information processing device 10, an odor presentation device 2, an operating device 3, and a display device 4.

The information processing device 10 may be, for example, a home-use game machine, a portable game machine, a personal computer, a smartphone, or a tablet. As illustrated in FIG. 1, the information processing device 10 includes a control section 11, a storage section 12, and an interface section 13.

The control section 11 includes at least one processor, such as a central processing unit (CPU), and executes a program stored in the storage section 12 to perform various information processes. Concrete examples of the processes performed by the control section 11 in the present embodiment will be described later. The storage section 12 includes at least one memory device, such as a random access memory (RAM), and stores the program to be executed by the control section 11 and data to be processed by the program.

The interface section 13 is a communication interface that permits the odor presentation device 2, the operating device 3, and the display device 4 to exchange various data. The information processing device 10 is wire-connected or wirelessly connected to the odor presentation device 2, the operating device 3, and the display device 4 through the interface section 13.

The odor presentation device 2 presents an odor to a user. The odor presentation device 2 releases an odorant to let the user smell a specific odor. The present embodiment assumes that a plurality of cartridges filled with a perfume generating a specific odorant can be inserted into and removed from the odor presentation device 2. In accordance with a control signal from the information processing device 10, the odor presentation device 2 releases an odorant from a specific cartridge. In this manner, the odor presentation device 2 can present to the user a plurality of different odors derived from the cartridges.

The odor presentation device 2 may be detachable from the body (e.g., head) of the user. When an odorant is released in the vicinity of the nose of the user in such an instance, the user will clearly smell an odor. Alternatively, the odor presentation device 2 may be built in the housing of the information processing device 10. Still alternatively, the odor presentation device 2 may be installed independently of the information processing device 10 and disposed fixedly in a room where the user is present.

The odor presentation device 2 is capable of releasing an odorant contained in a cartridge in various manners. More specifically, the odor presentation device 2 may use a fan or other blower mechanism to release outward an odorant volatilized from a perfume contained in a cartridge. Further, when the odor presentation device 2 is attached to the body of the user, the odor presentation device 2 may present to the user the odor of an odorant volatilized from a liquid absorbing material (e.g., filter paper), which is capable of absorbing a liquid, by impregnating the liquid absorbing material with an odorant in a cartridge and moving the liquid absorbing material to the vicinity of the nose of the user. It is assumed that the intensity of an odor to be presented to the user can be controlled by adjusting the amount of odorant to be released or by adjusting the distance between the user and the liquid absorbing material impregnated with the odorant. That is to say, the odor presentation device 2 can increase the intensity of an odor presented to the user by increasing the amount of an odorant to be released or by moving the liquid absorbing material impregnated with the odorant to the vicinity of the nose of the user.

Moreover, the odor presentation device 2 may incorporate a deodorizing function for deodorizing an odor generated by the odor presentation device 2. More specifically, the odor presentation device 2 may, for example, absorb an odorant to deodorize an odor by releasing a built-in deodorant in response to an instruction from the information processing device 10. Alternatively, a mechanism for taking in outside air may be incorporated to achieve deodorization by taking in a released odorant.

The operating device 3 receives an operation input from the user. The operating device 3 then inputs a signal indicative of a received user operation to the information processing device 10. The operating device 3 may be, for example, a keyboard or a controller of a home-use game machine. Further, the operating device 3 may include, for example, buttons disposed on the surface of the housing of the information processing device 10.

The display device 4 displays on a screen an image based on a video signal output from the information processing device 10. The present embodiment assumes that the display device 4 is a device worn on the head of the user, such as a head-mounted display. The display device 4 may be configured integrally with the housing the information processing device 10. Further, the odor presentation device 2 may be incorporated in the housing of the display device 4. In such an instance, an odor can be generated in the vicinity of the nose of the user to let the user clearly smell the odor.

Figure 2:
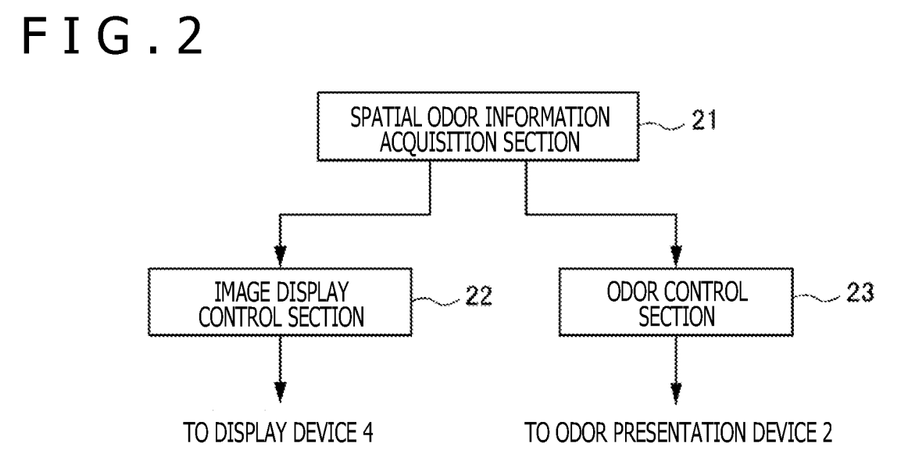
FIG. 2 is a functional block diagram illustrating the functions of the information processing device according to the embodiment of the present invention.

Functions implemented by the information processing device 10 will now be described with reference to FIG. 2. As illustrated in FIG. 2, the information processing device 10 functionally includes a spatial odor information acquisition section 21, an image display control section 22, and an odor control section 23. The functions of these functional sections are implemented when the control section 11 executes a program stored in the storage section 12. The program may be supplied to the information processing device 10 through the Internet or other communication network or supplied on an optical disk or other computer-readable information storage medium.

The spatial odor information acquisition section 21 acquires spatial odor information. The spatial odor information is the information about an odor in a reproduction target space. The spatial odor information is formulated by associating information about a position or direction in the space with information about the type, intensity, and other properties of the odor. The reproduction target space may be a real space (the space of reality) or a virtual space. The following describes an example of acquiring the spatial odor information about a real space.

As a concrete example, the spatial odor information about a real space is generated based on the result of actual odor measurement. In the example, an odor sensor S is disposed at a measurement target location (hereinafter referred to as the reference position O) in order to measure an odor that is actually smelled at the reference position O. It is assumed that the odor sensor S measures the type and intensity of an odor by measuring the amount (concentration) of each of a plurality of different odorants (odor molecules) in the air. The odor to be measured by the odor sensor S is hereinafter referred to as the reference odor. The reference odor may be, for example, a characteristic odor easily perceivable by a human or an odor to be reproduced by the information processing device 10. Here, it is assumed as a concrete example that the odor sensor S measures eight different reference odors F1 to F8.

Figure 3:
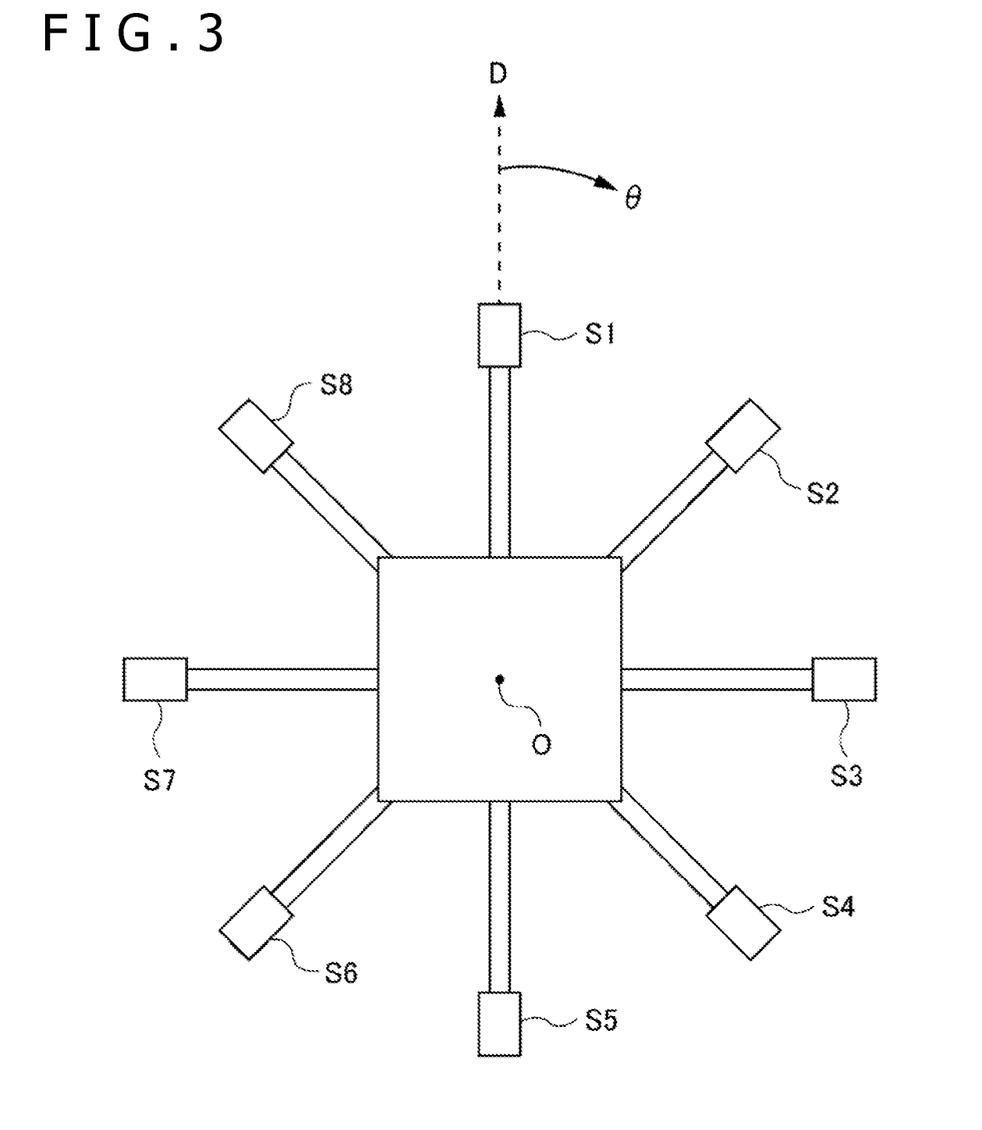
FIG. 3 is a diagram illustrating how an odor is measured.

Further, in the example, a plurality of odor sensors S are oriented in a plurality of different directions to measure odors generated in respective directions. FIG. 3 is a diagram illustrating how measurements are made by the odor sensors S, and is a top view of an area around a measuring device disposed at the reference position O. In the example of FIG. 3, eight odor sensors S1 to S8 are connected to one measuring device and oriented in a total of eight different directions, namely, a forward direction, a rearward direction, a leftward direction, a rightward direction, and four different oblique directions. Therefore, odors perceivable in eight different directions can be measured at the reference position O. In order to measure an odor perceivable in each of the different directions, it is preferable that measurements be made with the odor sensors S disposed at locations apart from the reference position O by a predetermined distance in the direction of a measurement target or with directional sensors adapted to intensively respond to an odor coming from a specific direction.

Although it is assumed here that odors perceivable in eight different directions are measured at locations equally spaced part in a plane, the number of directions targeted for measurement is not limited to eight. Any desired number of directions may be targeted for measurement. Further, the plurality of different directions need not always be equally spaced apart from each other. For example, with respect to important directions, the sensors S may be disposed at relatively short intervals to make measurements. Furthermore, the odor in an up-down direction (e.g., zenith direction and nadir direction) may be additionally measured and included in the spatial odor information. Moreover, it is assumed here that a plurality of odor sensors S are oriented in different directions to simultaneously measure an odor. Alternatively, however, odors in a plurality of directions may be measured by repeatedly making measurements with one odor sensor S oriented in each of a plurality of different directions of the measurement target. Additionally, it is assumed here that each of a plurality of different reference odors can be measured by one odor sensor S. Alternatively, however, the intensity of a reference odor perceivable in each of different directions may be measured by using a plurality of different odor sensors S that are each capable of measuring a limited number of reference odors.

Figure 4:
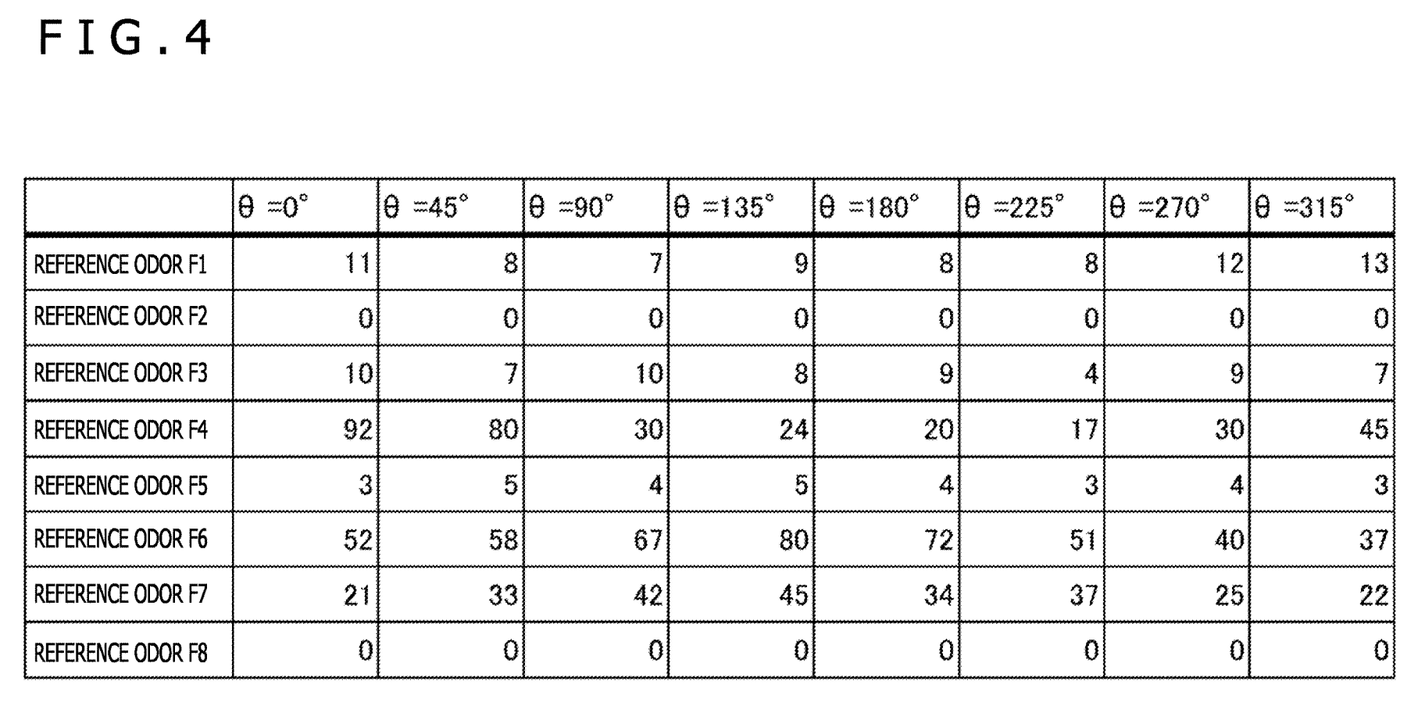
FIG. 4 is a diagram illustrating an example of spatial odor information.

FIG. 4 is a diagram illustrating an example of spatial odor information that is acquired by making measurements through the use of the arrangement depicted in FIG. 3. In the example of FIG. 4, the directions in which the individual odor sensors S are oriented are expressed by the azimuth angle θ. Here, it is assumed that the direction in which the odor sensor S1 is oriented as viewed from the reference position O is expressed by the equation θ=0 degrees, and that a clockwise direction as viewed from the zenith direction is the positive direction of θ. That is to say, the directions of measurements made by the eight odor sensors S1 to S8 are expressed by an angle at 45 degrees intervals from θ=0 degrees to θ=315 degrees. The direction of θ=0 degrees in which the odor sensor S1 is oriented is hereinafter referred to as the reference direction D. Odor information about each direction is expressed by numerical values indicative of the intensities of the eight different reference odors F1 to F8. A numerical value indicative of the intensity of each reference odor that is determined by measurements made by the odor sensors S is hereinafter referred to as the odor intensity value.

The spatial odor information acquisition section 21 may acquire values measured by the odor sensors S connected to the information processing device 10 and use the acquired values as the spatial odor information. Alternatively, the spatial odor information acquisition section 21 may acquire the spatial odor information by receiving information about the results of measurements made in advance by an external device, for example, through a communication network. Still alternatively, the spatial odor information may be stored on a computer-readable information storage medium and supplied to the information processing device 10.

Further, it is assumed that the spatial odor information acquisition section 21 not only acquires the spatial odor information indicative of an odor at the reference position O, but also acquires a spatial image depicting the scene of a real space viewed from the reference position O. The spatial image can be generated by setting a camera at the reference position O and allowing the camera to capture an image of a surrounding scene. The spatial image may be a panoramic image including the scene of a whole sky that is recorded in an equirectangular projection or other similar format or an image including the scene of a limited range. Further, the spatial image may be captured by a panoramic camera capable of taking a wide-angle shot or generated by joining a plurality of images captured from different directions. Capturing images and measuring odors as described above makes it possible to acquire information about the scene of a real space to be reproduced and information about odors.

Furthermore, it is assumed that information (hereinafter referred to as the correspondence information) indicative of the correspondence to directional information included in the spatial odor information is attached to the spatial image acquired by the spatial odor information acquisition section 21. When the spatial odor information includes the odor information about each direction in a situation where the reference direction D is expressed by the equation θ=0 degrees, the correspondence information indicating which direction in the spatial image corresponds to the reference direction D is required to associate the spatial odor information with the spatial image. If, for example, the equirectangular projection format is employed, the spatial image is a rectangular image having a height-to-width ratio of 1:2, and a straight line joining the midpoint of the left side to the midpoint of the right side (i.e., a center line dividing the image into upper and lower halves) corresponds to the horizontal plane of a real space. One point of the center line corresponds to the reference direction D as viewed from the reference position O. Thus, in addition to the spatial image, the spatial odor information acquisition section 21 acquires information about coordinate values of the point corresponding to the reference direction D in the spatial image as the correspondence information. The correspondence information may be manually set by the user who has made odor measurements with the odor sensors S and captured the spatial image. Alternatively, the information processing device connected to the camera and the odor sensors S may detect the orientation of the camera during image capture and the orientation of the odor sensors S during measurement, and automatically generate the correspondence information by using the detected information.

Moreover, the spatial odor information acquisition section 21 may acquire, as the spatial odor information, information derived from the analysis of the results of measurements made by the odor sensors S, which are acquired from the outside, instead of acquiring the results of measurements made by the odor sensors S as the spatial odor information. For example, the spatial odor information acquisition section 21 may estimate the direction of an odor source, which generates a measured odor, as viewed from the reference position O and include the estimated direction in the spatial odor information. As an example, FIG. 4 indicates that the reference odor F4 is intensively perceived in the direction of θ=0 degrees and in the direction of θ=45 degrees, and that the intensity of the odor decreases with an increase in the deviation from such directions. In this instance, it is estimated that the odor source, which generates the odor, exists between the direction of θ=0 degrees and the direction of θ=45 degrees. Thus, for a specific reference odor, the direction in which the odor source exists may be estimated from the distribution of the odor intensity value in each direction, and information indicative of the estimated direction may be included in the spatial odor information. Further, the distance to the odor source or the intensity of the odor emitted from the odor source may be estimated from the measured odor intensity value and included in the spatial odor information.

Furthermore, the spatial odor information acquisition section 21 may eliminate unimportant odor information from the results of measurements made by the odor sensors S. For example, the spatial odor information acquisition section 21 may discard low-order bits of the odor intensity value included in the results of measurements made by the odor sensor S in accordance with the quantization unit of the intensity of the odor presented by the odor presentation device 2. As a concrete example, if the odor presentation device 2 is capable of adjusting the odor intensity in eight increments, the spatial odor information acquisition section 21 may keep three high-order bits of the measured odor intensity value and discard the low-order bits. Moreover, reference odor intensity values smaller than a predetermined value may be regarded as 0 (zero). Additionally, when the direction of a particular odor source generating a specific reference odor is estimated in the above-described manner, the odor intensity value of a reference odor measured in a direction that is deviated from the direction of the particular odor source by a predetermined angle or more may be regarded as 0 (zero). Making the above corrections reduces the amount of information included in the spatial odor information.

Further, the spatial odor information acquisition section 21 may synthesize the results of measurements made by a plurality of odor sensors S having different sensitivities in order to generate a wide range of odor data that cannot be measured by a single odor sensor S.

The image display control section 22 causes the display device 4 to display a display image that is generated based on a spatial image acquired by the spatial odor information acquisition section 21. More specifically, the image display control section 22 identifies an attention direction in which the user pays attention within the reproduction target space. The image display control section 22 then generates a display image depicting a part of a scene that is included in the spatial image and centered on the attention direction, and causes the display device 4 to display the generated display image. If the attention direction subsequently changes, the image display control section 22 redraws the display image in accordance with such a subsequent change and causes the display device 4 to display the redrawn display image. Repeating the above-described process permits the user to view the scene within a predetermined range that is included in the spatial image.

The attention direction corresponds to the gaze direction of an observer within the reproduction target space, and is defined, for example, by the azimuth angle $\theta$ along the horizontal direction and the elevation angle $\phi$ along the vertical direction. Here, it is assumed that the image display control section 22 changes the attention direction in such a manner as to coordinate with changes in the orientation of the display device 4 on the head of the user. In order to exercise such control, the odor presentation system 1 has a function of identifying the changes in the orientation of the display device 4. This identification function can be implemented, for example, by a motion sensor (acceleration sensor, gyroscope, geomagnetic sensor, etc.) built in the display device 4. Instead of or in addition to such a motion sensor, the camera attached to the display device 4 may be used to identify the changes in the orientation of the display device 4 in accordance with changes in the image captured by the camera. An alternative is to identify the changes in the orientation of the display device 4 by allowing a camera disposed to face the user to capture an image depicting an area around the display device 4 and identifying the motion of the display device 4 within the captured image. In any case, when the changes in the orientation of the display device 4 are identified, the image display control section 22 can update the attention direction so that the orientation of the display device 4 always agrees with the attention direction. This makes it possible to control the display image so that the visible scene changes in coordination with the motion of the user's face.

When the image display control section 22 starts to display the spatial image, the attention direction may be as represented, for example, by the equations $\theta=0$ degrees and $\phi=0$ degrees. It is assumed that the azimuth angle $\theta$ of the attention direction corresponds to the azimuth angle $\theta$ at which the spatial image is captured. That is to say, when the azimuth angle $\theta$ of the attention direction is 0 degrees, the display device 4 displays a scene that is visible when the reference direction D is viewed from the reference position O. If the user faces rightward in the above state, the display device 4 displays a scene that is visible when the direction expressed by the equation $\theta=90$ degrees is viewed from the reference position O. If the user faces leftward in the above state, the display device 4 displays a scene that is visible when the direction expressed by the equation $\theta=270$ degrees is viewed from the reference position O. Exercising control in the above manner permits the user to view a scene as if the user were present at the reference position O.

In accordance with the changes in the attention direction identified by the image display control section 22, the odor control section 23 controls the odor to be presented to the user. More specifically, the odor control section 23 instructs the odor presentation device 2 to present an odor that is perceivable from the attention direction. Here, the odor control section 23 determines the instruction for odor presentation in such a manner as to reproduce an odor perceivable in a real space. The instruction is determined based on the spatial odor information acquired by the spatial odor information acquisition section 21.

Here, it is assumed that the odor presentation device 2 releases eight different odorants corresponding to the reference odors F1 to F8. It is preferable that the odorants to be released by the odor presentation device 2 be identical with the odorants to be detected by the odor sensors S1 to S8. However, the odorants to be released by the odor presentation device 2 may generate odors that are perceivable by a human and similar to those detected by the odor sensors S1 to S8. It is also assumed that the odor presentation device 2 is capable of presenting various types of odors at an intensity according to an instruction from the odor control section 23. In this instance, the odor control section 23 determines the odor intensity of each of the eight different odorants by using the spatial odor information, and instructs the odor presentation device 2 to present an odor in accordance with the determination. If, for example, the azimuth angle of the attention direction is an angle of $\theta=90$ degrees in the example of FIG. 4 depicting the acquisition of spatial odor information, the odor control section 23 references the spatial odor information about an angle of $\theta=90$ degrees and determines the instruction to be issued to the odor presentation device 2. More specifically, the odor control section 23 issues an instruction for presenting to the user an odorant corresponding to the reference odor F4 at an intensity of 30, an odorant corresponding to the reference odor F6 at an intensity of 67, and an odorant corresponding to the reference odor F7 at an intensity of 42. Here, a reference odor for which the value measured by an odor sensor S is 10 or smaller is excluded from an odor presentation target. This makes it possible to present to the user an odor that is probably perceived by the user when the user standing at the reference position O faces in the direction of $\theta=90$ degrees during spatial odor information measurement. In this instance, the display device 4 displays a scene that is visible when the direction of $\theta=90$ degrees is viewed from the reference position O. This permits the user to experience a visible and olfactory sensation as if the user were actually present at the reference position O.

If the attention direction does not agree with the direction in which a measurement is made by an odor sensor S, the odor control section 23 references the spatial odor information about a direction closest to the attention direction in order to determine the odor to be presented. As an example, while the attention direction is within the range of $\theta=22.5$ degrees to $\theta=77.5$ degrees, the odor control section 23 determines an odor presentation in accordance with the spatial odor information about an angle of $\theta=45$ degrees. Alternatively, if the attention direction does not agree with the direction in which a measurement is made by an odor sensor S, the odor control section 23 may determine the intensity of each reference odor by performing an interpolation process. If, as a concrete example, the attention direction is at an angle of $\theta=100$ degrees, the odor control section 23 performs an interpolation process by using the spatial odor information about an angle of $\theta=90$ degrees and the spatial odor information about an angle of $\theta=135$ degrees in order to calculate the intensity of an odor probably perceivable at a position of θ=100 degrees, and instructs the odor presentation device 2 to present the odor at the calculated intensity. This ensures, without regard to the attention direction, that the odor perceivable in a direction identical with the attention direction can be presented to the user. Further, if the spatial odor information includes information, for example, about the direction of and distance to the aforementioned odor source, the odor control section 23 may approximately estimate the intensity at which the odor generated from the odor source is perceivable when the user at the reference position O faces the attention direction, and issue an instruction to the odor presentation device 2 in accordance with the result of estimation.

It is assumed that the odor control section 23 repeatedly issues the above-described instruction for odor presentation at fixed time intervals. If it is no longer necessary to present the odor that has been presented in accordance with a change in the attention direction, the odor control section 23 may exercise a deodorization function to eliminate the odor that has been presented, and newly present an odor in accordance with a changed attention direction.

Figure 5:
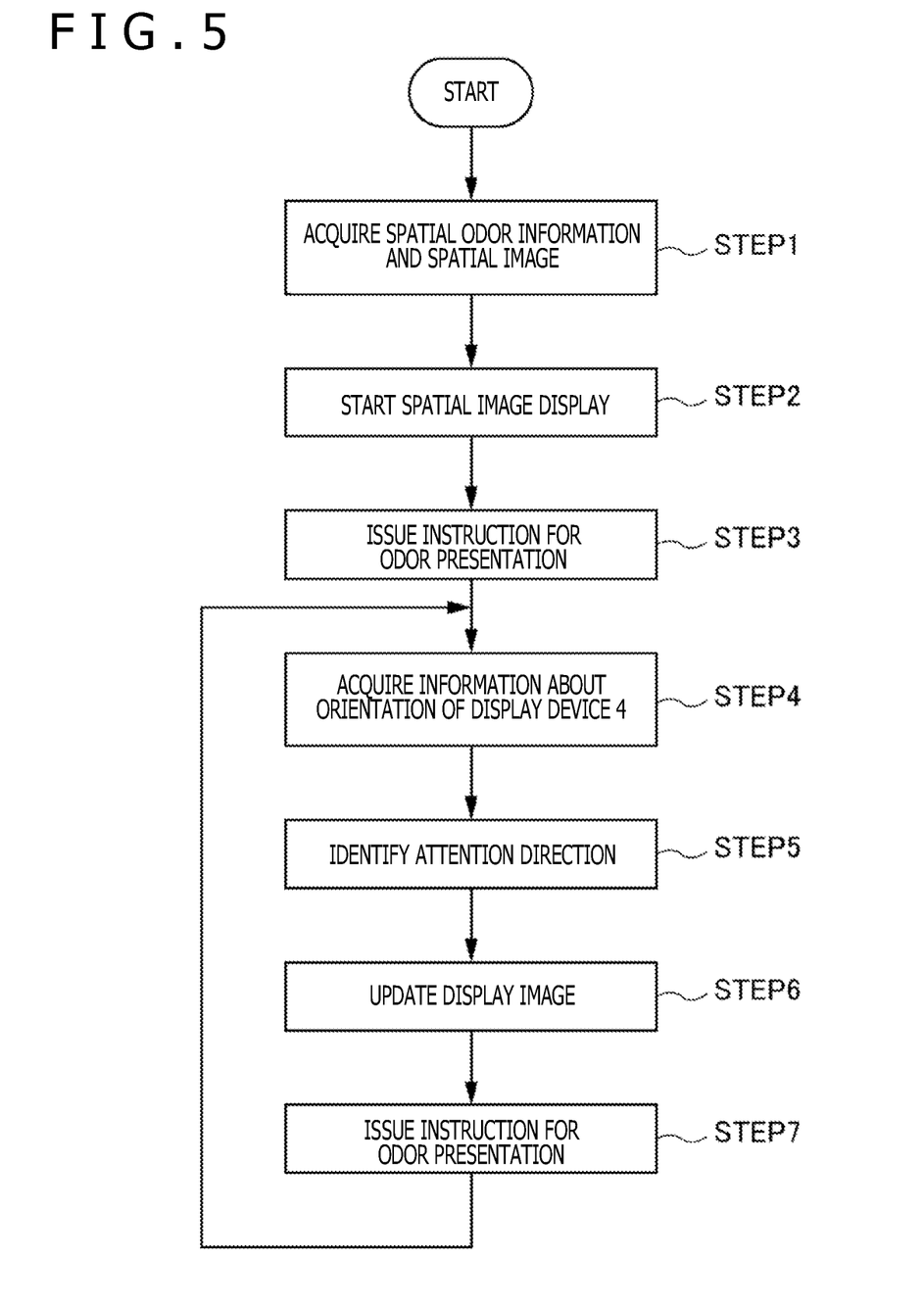
FIG. 5 is a flowchart illustrating an exemplary process that is performed by the information processing device according to the embodiment of the present invention.

An exemplary process performed by the information processing device 10 according to the present embodiment will now be described with reference to the flowchart of FIG. 5.

First of all, the spatial odor information acquisition section 21 acquires the spatial odor information and the spatial image (STEP 1). Next, the image display control section 22 starts to display the spatial image in response, for example, to an instruction from the user (STEP 2). In this instance, the image display control section 22 regards, for example, the reference direction D as the attention direction, and determines an initial display range of the spatial image. Next, the odor control section 23 instructs the odor presentation device 2 to present an odor in accordance with the current attention direction (STEP 3).

Subsequently, after the lapse of a predetermined period of time, the image display control section 22 acquires information about the current orientation of the display device 4 (STEP 4), and identifies the current attention direction of the user in accordance with the acquired information (STEP 5). The display image to be displayed on the display device 4 is then updated in accordance with the attention direction that is newly identified in STEP 5 (STEP 6). Further, the odor control section 23 instructs the odor presentation device 2 to present an odor in accordance with the attention direction identified in STEP 5 (STEP 7). Subsequently, the image display control section 22 and the odor control section 23 return to STEP 4 and repeatedly perform STEPS 4 to 7 until the spatial image is completely displayed in response, for example, to an instruction from the user.

The information processing device 10 according to the present embodiment described above is able to present to the user an odor, which changes with the attention direction, by determining the odor to be presented to the user through the use of the spatial odor information based on the direction in the real space.

The foregoing description assumes that the display device 4 is a head-mounted display device. However, the embodiment of the present invention is not limited to such a display device. The display device 4 may be a stationary device such as a liquid-crystal display. If such a stationary display device is used, the user changes the attention direction, for example, by entering a directional instruction into the operating device 3. In accordance with such a change in the attention direction, not only the image display control section 22 changes the scene to be displayed on the screen of the display device 4, but also the odor control section 23 instructs the odor presentation device 2 to present an odor based on the attention direction. This permits the user to experience the scene and odor at the reference position O.

The spatial odor information acquisition section 21 may generate the spatial odor information by adding an odor generated from a virtual odor source to the information derived from measurements actually made by the odor sensors S. More specifically, when a virtual odor source is positioned at a predetermined distance and in a predetermined direction from the reference position O, the spatial odor information acquisition section 21 calculates the type and intensity of an odor that is generated from the virtual odor source and perceivable when the odor reaches the reference position O, and adds the results of calculation to the results of measurements made by the odor sensors S. This process can be used to implement augmented reality. A certain method available in augmented reality presents an image to the user in such a manner that a nonexistent object appears as if it existed in a real space. When the spatial odor information acquisition section 21 adds the odor of the above-mentioned virtual odor source to the spatial odor information and the odor control section 23 uses the resultant spatial odor information to control the odor to be presented to the user, the user feels as if a nonexistent odor source were existent. In this instance, the image display control section 22 causes the display device 4 to display a combined image that is obtained by superimposing an image depicting the external appearance of the odor source when the attention is directed toward the odor source, upon a scene generated based on the spatial image.

Further, the spatial odor information acquisition section 21 may acquire an odor probably perceivable in a virtual space as the spatial odor information. In this instance, for example, the spatial odor information acquisition section 21 calculates the intensity of an odor perceivable in each of a plurality of directions at the reference position O in a virtual space due to a virtual odor source disposed in the virtual space, and records the results of calculation as the spatial odor information. This calculation can be achieved in the same manner as described in conjunction with the foregoing example of augmented reality. The odor control section 23 references such spatial odor information and instructs the odor presentation device 2 to present an odor. When such an odor presentation is combined with the display of an image depicting the virtual space, the user feels as if the user were present in the virtual space.

The foregoing description assumes that the spatial image is a still image. However, the spatial image is not limited to a still image. The spatial odor information acquisition section 21 may acquire a spatial image that is obtained by capturing a moving image of a scene changing with time. In this instance, the spatial odor information may not be obtained by measuring an odor at a specific point time, but may be obtained by continuously measuring the odor for a fixed period of time and recording temporal changes in the intensity of the odor. When the above-described spatial image and spatial odor information are used to display an image and present an odor, the user experiences a reproduced space that changes with time. Further, in addition to the spatial odor information and the spatial image, the spatial odor information acquisition section 21 may acquire voice data that is obtained by recording ambient sound at the reference position O. When such a recorded voice is reproduced in addition to the display of the spatial image, the user experiences an enhanced realistic sensation.

The foregoing description assumes that the spatial odor information indicates the type and intensity of an odor perceivable in each of a plurality of directions. However, the spatial odor information is not limited to such information. For example, the spatial odor information may exclude an odor intensity value and indicate whether each of a plurality of different odors is present. Further, the spatial odor information may merely include information about a specific type of odor to be reproduced. Furthermore, although the foregoing description assumes that only the odor perceivable at the reference position O in a reproduction target space is to be reproduced, odors perceivable at a plurality of points may be reproduced. In this instance, the spatial odor information may include information indicative of the position of a reproduction target and the type and/or intensity of odor perceivable at that position.

REFERENCE SIGNS LIST

1 Odor presentation system, 2 Odor presentation device, 3 Operating device, 4 Display device, 10 Information processing device, 11 Control section, 12 Storage section, 13 Interface section, 21 Spatial odor information acquisition section, 22 Image display control section, 23 Odor control section.

The invention claimed is:

1. An information processing device to be connected to an odor presentation device that presents an odor to a user, the information processing device comprising:
   a spatial odor information acquisition section that acquires spatial odor information indicative of an odor in a reproduction target space;
   an odor control section that instructs, by using the spatial odor information, the odor presentation device to present to the user an odor assumably perceivable in the reproduction target space,
   wherein the spatial odor information associates a viewing direction from a reference position in the reproduction target space with an odor assumably perceivable in the viewing direction; and
   an identification section that identifies an attention direction in which the user pays attention within the reproduction target space,
   wherein the odor control section determines, based on the spatial odor information and the identified attention direction, the odor to be presented to the user.

2. The information processing device according to claim 1,
   wherein the spatial odor information acquisition section further acquires a spatial image depicting a scene in the reproduction target space, and
   the information processing device further includes an image display control section that displays, based on the spatial image, an image depicting a scene in the identified attention direction.

3. The information processing device according to claim 1,
   wherein the reproduction target space is a real space, and
   the spatial odor information indicates the type and/or intensity of an odor measured by an odor sensor installed at a reference position in the real space.

4. A method for controlling an odor presentation device that presents an odor to a user, the method comprising:
   acquiring spatial odor information indicative of an odor in a reproduction target space;
   instructing, by using the spatial odor information, the odor presentation device to present to the user an odor assumably perceivable in the reproduction target space;
   associating a viewing direction from a reference position in the reproduction target space with an odor assumably perceivable in the viewing direction;
   identifying an attention direction in which the user pays attention within the reproduction target space, and
   wherein the odor control section determines, based on the spatial odor information and the identified attention direction, the odor to be presented to the user.

5. A non-transitory computer readable medium having stored thereon a program for controlling an odor presentation device that presents an odor to a user, the program comprising:
   by an acquisition section, acquiring spatial odor information indicative of an odor in a reproduction target space;
   by an odor control section, instructing, by using the spatial odor information, the odor presentation device to present to the user an odor assumably perceivable in the reproduction target space;
   wherein the spatial odor information associates a viewing direction from a reference position in the reproduction target space with an odor assumably perceivable in the viewing direction; and
   by an identification section, identifying an attention direction in which the user pays attention within the reproduction target space,
   wherein the odor control section determines, based on the spatial odor information and the identified attention direction, the odor to be presented to the user.

* * * * *